(12) United States Patent
Mercouroff et al.

(10) Patent No.: US 6,266,406 B1
(45) Date of Patent: Jul. 24, 2001

(54) METHOD FOR COMMUNICATING BETWEEN A SERVICE SWITCHING EXCHANGE OF A TELECOMMUNICATION NETWORK AND SERVICE CONTROL FACILITY

(75) Inventors: Nicolas Mercouroff; Alban Couturier, both of Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/057,802

(22) Filed: Apr. 9, 1998

(30) Foreign Application Priority Data

Apr. 14, 1997 (EP) .................................................. 97440035

(51) Int. Cl.$^7$ ...................................................... H04M 7/00
(52) U.S. Cl. ........................... 379/230; 379/221; 379/207
(58) Field of Search ..................................... 349/201, 207, 349/229, 230; 379/221, 220, 219

(56) References Cited

U.S. PATENT DOCUMENTS 5,463,682 * 10/1995 Fisher et al. .......................... 379/201

FOREIGN PATENT DOCUMENTS 9534175    12/1995  (WO) .

OTHER PUBLICATIONS

"Distribution of Service Data to Distributed SCPs in the Advance IN" by Kusaura et al. Nov. 14, 1995, Singapore, pp. 1272–1276.

"Distributed Control Node Architecture in the Advanced Intelligent Network", by Hirano et al. Apr. 23, 1995, Berlin, Germany, pp. 278–282.

"Signalling in the Intelligent Network" by Bale. Vol. 13, No. 2, Apr. 1995 Ipswich, GB. pp. 30–42.

"CORBA: A Common Touch for Distributed Applications" by Tibbitts. vol. 24, No. 7, May 21, 1995, New York, US, pp. 71–75.

* cited by examiner

*Primary Examiner*—Creighton Smith
(74) *Attorney, Agent, or Firm*—Ware, Fressola, Van Der Sluys & Adolphson LLP

(57) ABSTRACT

The invention concerns a method for communicating between a service switching exchange of a telecommunication network, to which service calls requesting the execution of a service for a subscriber of the telecommunication network are routed, and a service control facility, which controls the execution of the requested service. The service switching exchange interacts with one or several objects of the service control facility via an transaction capability application part protocol. Each such object interacts and communicates via an object infrastructure with other objects in an object oriented computing environment within the service control facility. The interface of each such object maps the primitives of the transaction capability application part protocol onto the internal interface description of the each such object.

10 Claims, 5 Drawing Sheets

FIG. 6

```
interface TCAPITF oneway void beginInd (in TCAPITF sender,
                          in unisgned long dialogId,
                          in sequence (octet) destAddr,
                          in sequence (octet) oriAddr,
                          in qosType qos,
                          in sequence (octet) applName,
                          in sequence (octet) applInfo);
```

METHOD FOR COMMUNICATING
BETWEEN A SERVICE SWITCHING
EXCHANGE OF A TELECOMMUNICATION
NETWORK AND SERVICE CONTROL
FACILITY

TECHNICAL FIELD

The invention concerns a method for communicating between a service switching exchange of a telecommunication network to which service calls requesting the execution of a service for a subscriber of the telecommunication network are routed, and a service control facility, which controls the execution of the requested service. The invention is also directed to a service control facility for connecting to one or several service switching exchanges of a telecommunication network where the service control facility contains means for receiving service requests that request the execution of a service for a user of the telecommunication network from at least one of the service switching exchanges of the telecommunication network.

Telecommunication services can be provide according to the Intelligent Network Architecture.

BACKGROUND OF THE INVENTION

A user of a telecommunication network requests a service by dialing the number dedicated to the service. The call with this number is routed through the telecommunication network to a service switching exchange which recognize this call as call requesting the service. Then, this service switching exchange communicates via a data network with a service control facility, the so called service control point. This service control point contains a service logic which contains a description of the method that has to be executed to provide the service to the calling user. By a request of the service switching exchange the execution of this method by the service logic is initiated and the requested service is provided to the requesting user.

This service logic is realized as a single process handling all calls one after the other. Each of them going through a single queue. Each call is associated with a context allowing the state of the call not to be lost between user interaction. The service is executed through a finite state machine, taking as input the TCAP message as the context of the call.

The disadvantage of this architecture of provisioning services is that within the service control facility an incoming request for a service has to wait for execution until the current one has been processed out. Therefore, the rate of service requests that can be handled by the service control facility is strictly limited.

SUMMARY OF THE INVENTION

Accordingly, it is a primary objective of the present invention to increase the number of service requests that can be handled by a processing node that is involved in the execution of services for users of an telecommunication network.

This objective is solved by a method for communicating between a service switching exchange of a telecommunication network, to which service calls requesting the execution of a service for a subscriber of the telecommunication network are routed, and a service control facility, which controls the execution of the requested service, wherein the service switching exchange interacts with at least one object of the service control facility via a transaction capability application part protocol, that each such object interacts and communicate via an object infrastructure with other objects in a object oriented computing environment within the service control facility, and that the interface of each such object maps the primitives of the transaction capability application part protocol onto the internal interface description of such object.

The objective is also solved by a service control facility for connecting to one or several service switching exchanges of a telecommunication network, where the service control facility contains means for receiving service requests that request the execution of a service for a user of the telecommunication network from at least one of the service switching exchanges of the telecommunication network, wherein the service control facility contains at least one object interacting and communicating via an object infrastructure with other objects in a object oriented computing environment within the service control facility, that the at least one object contains means for interacting with the at least one service switching exchange via an transaction capability application part protocol, and that the at least one object contains an interface that maps the primitives of the transaction capability application part protocol onto the internal interface description of the at least one object.

The underlying idea of this invention is to use for the realization of the data processing in a service control facility an object oriented approach with objects that interact on top of an object infrastructure and realize the communication between these object and the service switching functions of a service switching exchange via a transaction capability application part protocol. The objects mimic an interface for this protocol over the internal interface description.

Therefore, the service architecture is no longer based on a functional design and technologies like multithreading or multi processing can be applied.

Further, the one to one relationship from the service switching exchange to the service implementation is replaced by a one to many.

Due to the introduction of a object oriented computing environment and the special object design described above, the processing of the service requests can be distributed and thus highly scalable and IT platform independent. The redesign of the service logic according to this approach allows for easy service interworking personalization, distribution and maintainability of the software. The design pattern allows all the benefits from object oriented programming to be realized.

Furthermore, it allows multithreading. The direct benefit is that a service session, that means the processing of a service request, is not blocked by the execution of another one.

A communication made according to the invention has further advantages compared with the more usual approach to make a direct mapping between the transport protocol INAP and the interface description IDL; that is, this approach needs a heavier chain tool and does not envision the configuration of the network.

BRIEF DESCRIPTION OF THE DRAWINGS

The present invention will now be described with reference to the accompanying drawings, wherein

FIG. 6 illustrates the code with respect to the interface TCAPITF.

BEST MODE FOR CARRYING OUT THE INVENTION

Figure 1:
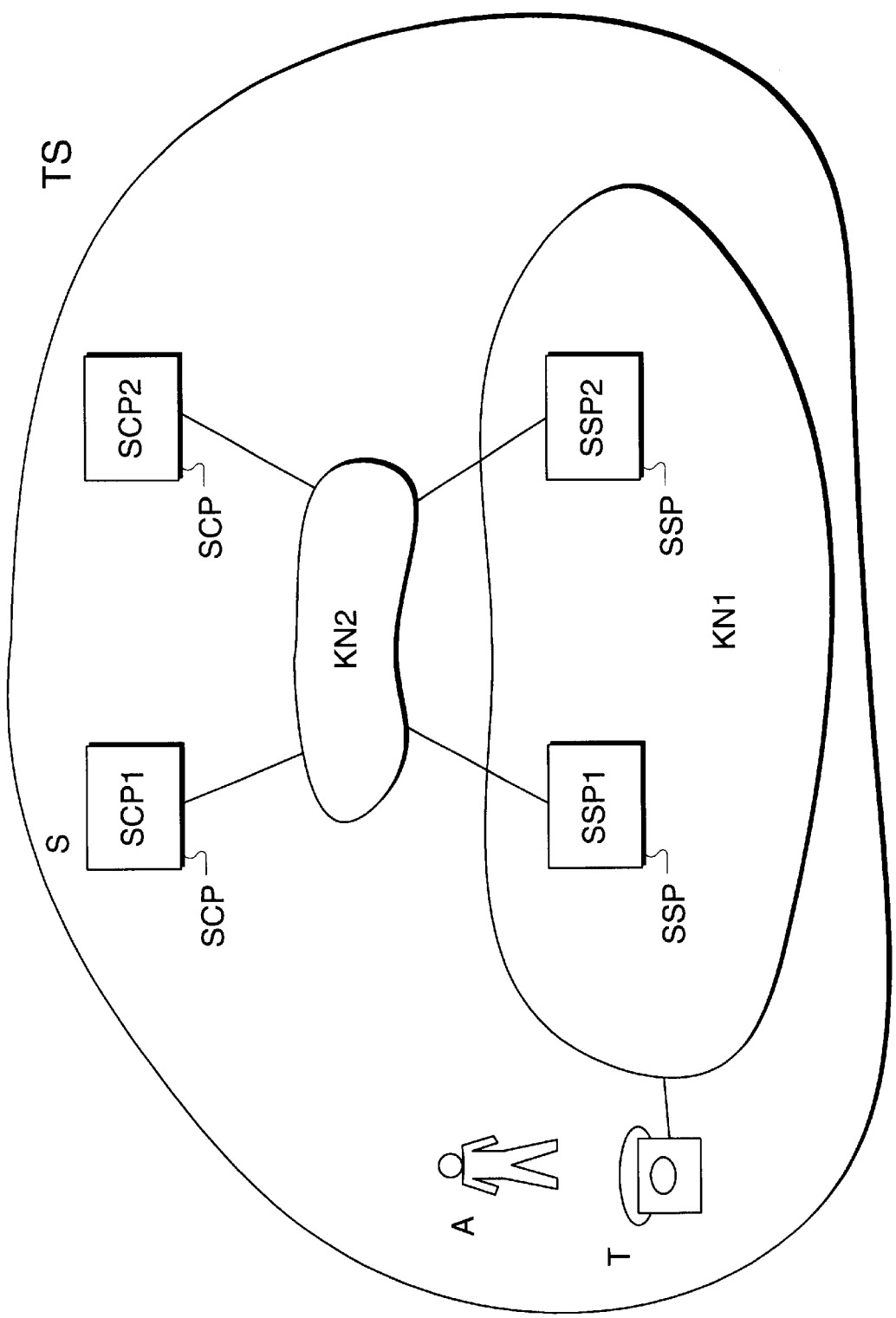
FIG. 1 is a block diagram presenting the architecture of a telecommunication system containing a service control facility according to the invention.

FIG. 1 shows a telecommunication system TS with an telecommunication network KN1, a subscriber terminal T assigned to a subscriber A, a communication network KN2 and two service control facilities SCP1 and SCP2.

The telecommunication network KN1 is for example a telephone network. It is also possible that this network is a data network or a communication network for mixed data, speech and video transmission. Incidentally, abbreviations used here will be explained as they are first used, or will be explained in a glossary of abbreviations below, or can be found in Newton's Telecom Dictionary.

From the exchanges of the network KN1 two special designed exchanges SSP1 and SSP2 are showed. These exchanges are service switching exchanges that contain a service switching functionality SSP. To these exchanges service request calls from the subscriber of the network are routed. When such a service switching exchange receives such a service request, it sends a corresponded request via the network KN2 to one of the two service control facilities SCP1. The service is then provided under the control of the respective one of the service control facilities SCP1 and SCP2.

Each of the service control facilities SCP1 and SCP2 provides one or several services S so as to realize a service control function.

The communication network KN2 is preferably a data network, especially according to the SS7 signaling protocol. It is also possible that this network is an LAN (Local Area Network), a MAN (Metropolitan Area Network) or an ATM (Asynchronous Transfer Mode) network.

Preferable, the service switching exchanges SSP1, SSP2, and the communication between them and the service control facilities SCP1, SCP2 are designed according to the Intelligent Network Architecture (according to the service switching point and according to the communication between the service switching point and the service control point), described for example in the ITU-T Q.1214 Recommendation.

If a user wants to start a service S, he dials a specific number for that service. The local exchange will route this call to the nearest service switching exchange and this will trigger the service switching functionality SSP to start the service. This is done by sending a request to the SCP to start executing a Service Logic Program (SLP). An SLP is specific for each service, it will instruct the network on how to handle the service. It will execute service logic, statistic logic, database logic, charging logic, etc. It will also provide instructions for the switch (e.g. create the second leg of the call) and Intelligent Peripherals (IP) (e.g. announcement machines). The INAP protocol is used for this, and INAP messages are transported in TCAP messages between the SCP and SSP.

When designing a distributed application, first the possible system components to be distributed are identified (i.e what the objects of the system are and how they will be grouped into larger objects that will be distributed).

Figure 2:
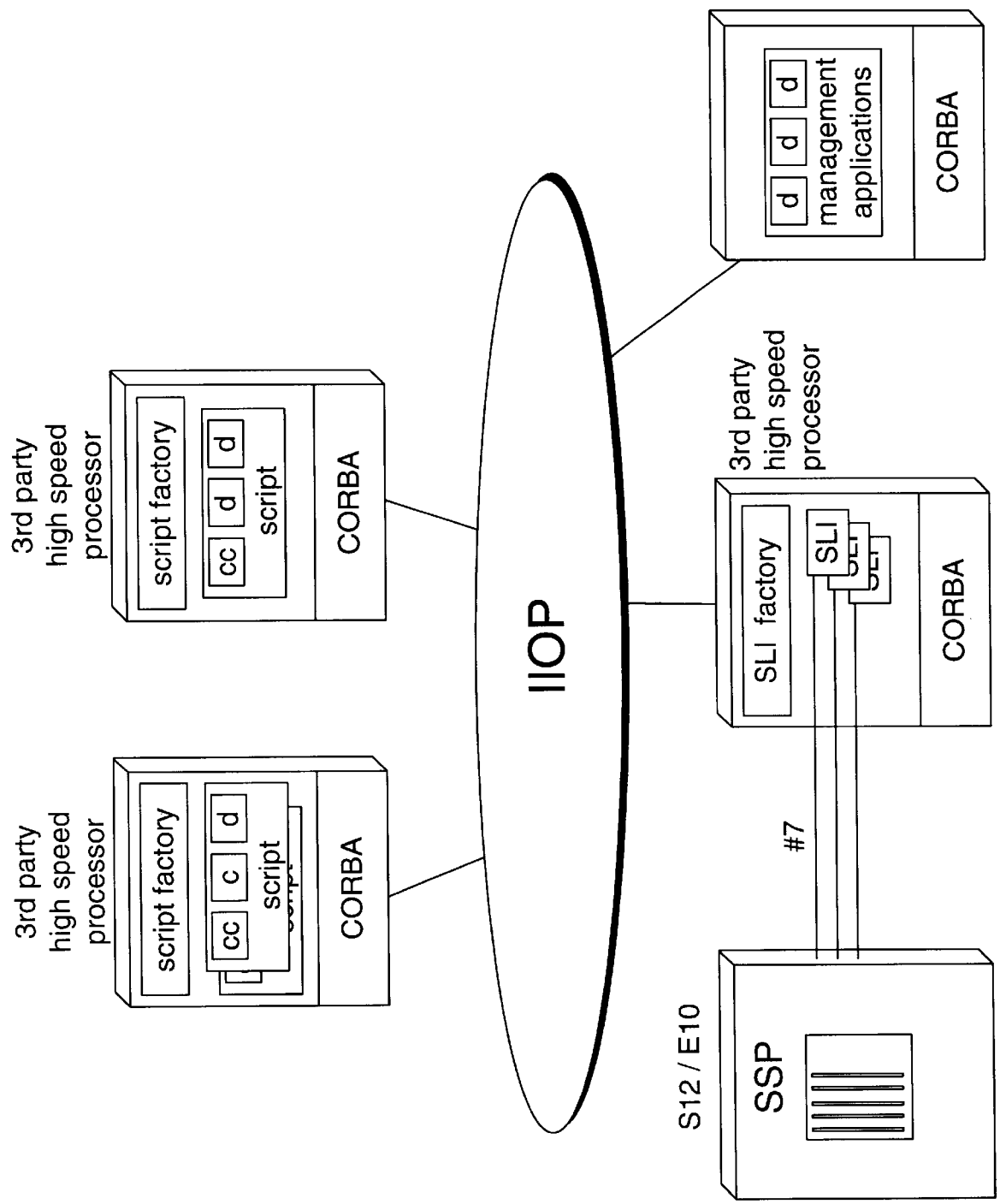
FIG. 2 is a block diagram presenting a first object architecture of the telecommunication system.
Figure 3:
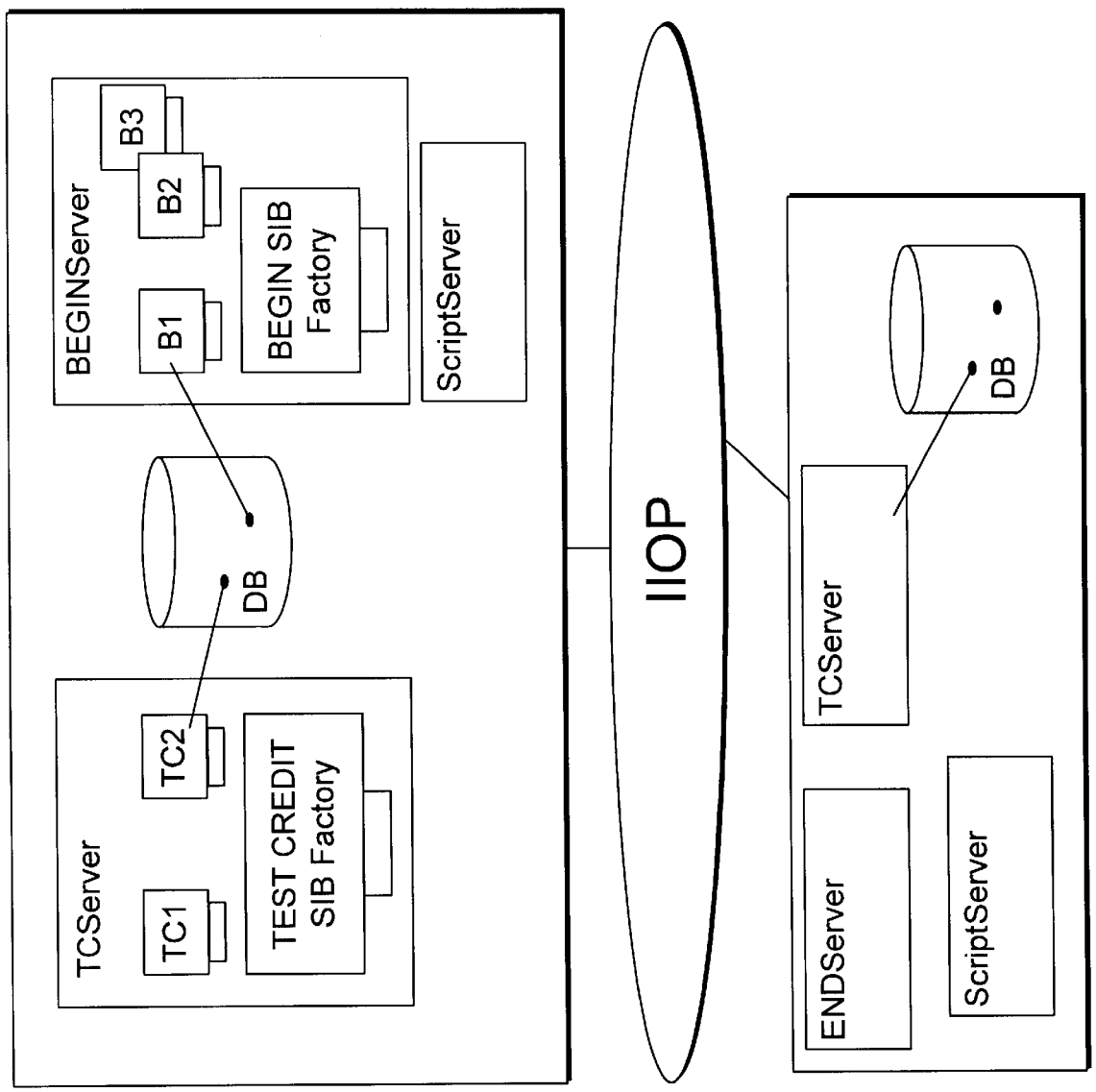
FIG. 3 is a block diagram presenting a second object architecture of the telecommunication system.

The breaking down of the SCP into objects offers some possibilities. FIGS. 2 to 3 depict these organized into different architectures. All state information for handling one call to be kept together and that all needed data are organized into objects. So, one possibility for SCP objects is a script object that executes the service logic for one call and an object per data object.

The values of the data objects are kept in a database, so having data objects that hide the use of a database is preferable (i.e. certain independence on the database). The catch lies in the fact that making these objects CORBA objects gives us a considerable overhead when methods (e.g. to read or write attribute values) are called on them. So, the system performance would become unacceptable.

The script object could be decomposed into a service execution engine and a SIB graph. So, SIBs could become distributed objects too. If database objects are distributed, this offers the possibility to execute a SIB on the machine were the particular data object resides. We can envisage a scheme where there is a control entity (a script) that executes SIBs remotely (possibility of having more overhead) or a scheme where control is passed from SIB to SIB. This trade off between getting the data and running a script on one machine and running parts of a script (SIBs) where the data resides is certainly worth investigating.

Figure 4:
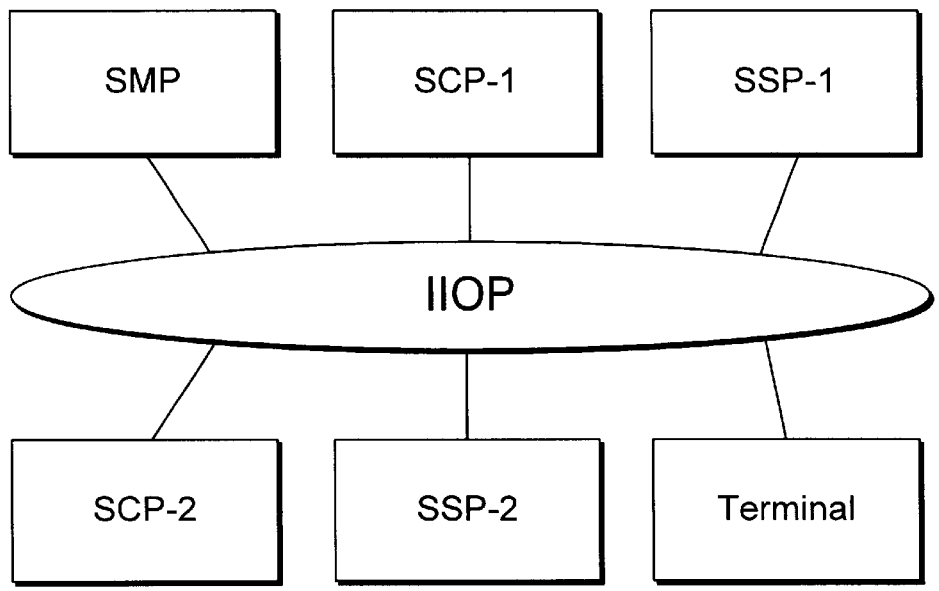
FIG. 4 is a block diagram presenting a third object architecture of the telecommunication system.
Figure 5:
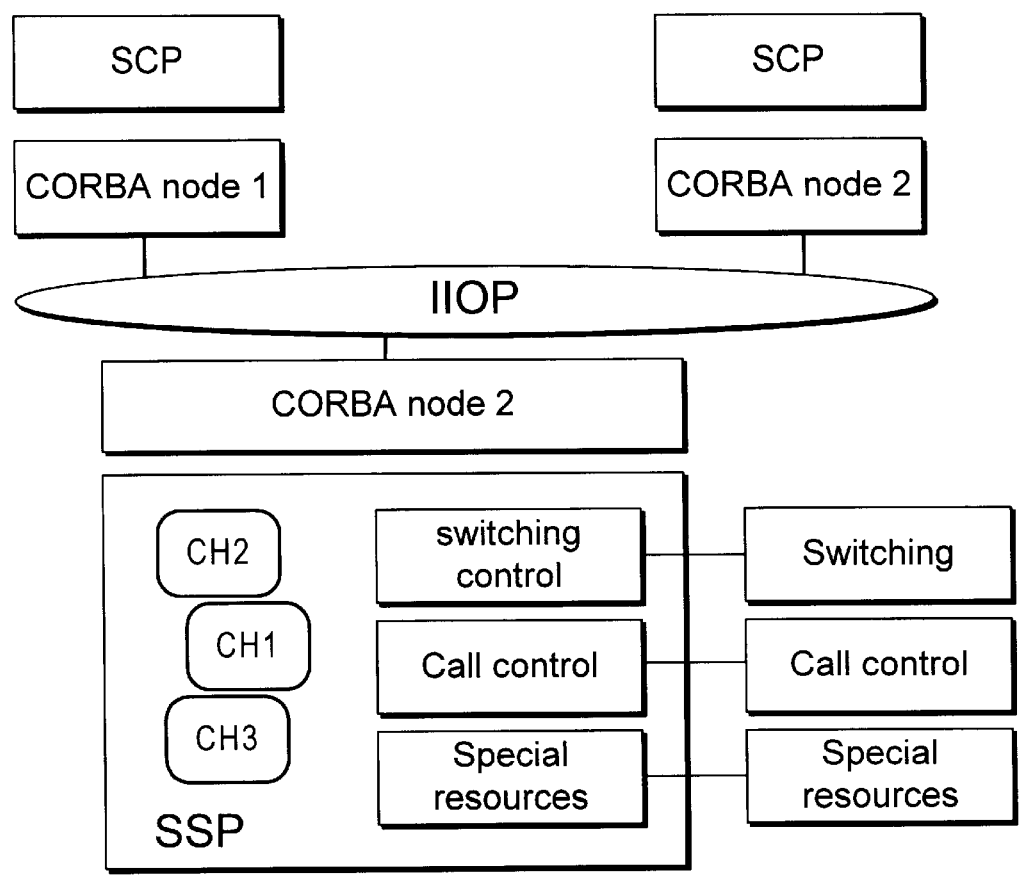
FIG. 5 is a block diagram presenting a object architecture of a service switching exchange for the telecommunication system.

The SSPs main functionality is to provide a hook between the call processing and the IN system. An SSP server must at least have an object that bridges between the normal Call Control Function (CCF) and an object that bridges between the Switching Function (SF). Also an object that bridges between Specialized Resources (SRF) (e.g. announcement equipment), seems to be obvious. In FIG. 4, these objects are depicted as a Switching Control, Call Control and Special Resources Object. We also need an object, Call Handler (CH) that interlaces with the SCP and the other objects in the SSP. There are two possibilities: there will be only one that handles all calls, or several, each handling one call. If we have several, existing only for the duration of the call, we also need a corresponding factory object to control the lifecycle of these objects.

In the following is given the architecture of an SSP server on CORBA.

For the Switching Control, Call Control and Special Resources objects we could have two approaches. In the first approach they are only interface objects between the proprietary Application Interface (API) of existing software. In the second approach they would control the hardware directly, what implies providing a CORBA interface to Switching Control, Call Control & Special Resources. In theory this would be the best solution, since the approach would give an overall consistent software architecture, in this case a special IDL adapter interface is required.

An SMP is responsible for service control and monitoring. In order to be able to control services, the SMP does not need to be a DPE object. What is needed is that the objects that are controlled (e.g. script) provide an interface to do so. For monitoring we need an SMP object that is able to receive 'events' from the objects that are being monitored. In our research prototype we defined and implemented a trace control as an example on what is possible as management functionality on the SCP.

In the previous section we have described a number of possibilities for CORBA objects in an IN Architecture. In this section we will group certain of these CORBA objects into a specific architecture. The sequence of the architectures can be seen as a possible evolution scenario, starting from current days service provisioning, especially IN, products.

The basis of the first architecture is the usage of a distributed database for data distribution and CORBA distribution for distributed SCP. This architecture is designed to interface with existing SSPS, so the SSP is not a CORBA object. Since this architecture was used to implement a research prototype, we elaborate on it more than the others. FIG. 3 depicts the architecture.

The basic components in the architecture are:

the script: a CORBA object that handles exactly one call the SLI (Service Logic Interface), a CORBA object that handles a TCAP dialogue for, and interfaces with the SSP.

the distributed DB.

Existing IN service scripts can encapsulated in Script objects.

A Script object also contains the Service Data and Call Context related to a particular call, and one Script object is instantiated per call. The interface of the Script object contains operations that represent the TCAP messages that the Script receives during its execution.

A special Service Logic Interface (SLI) object receives the #7 messages from the SSP and dispatches them to the corresponding script object instantiation, using the ORB services. The interface of the SLI object contains the TCAP messages that can be sent to it. One SLI object is instantiated per call.

Since the Script and SLI objects exist only during the lifetime of a call corresponding factory objects are used to create and destroy them. Data objects are not CORBA objects, they are implemented as C++ objects. This approach hides the use of a particular database from the service logic.

It is possible to use as a database for example Oracle, SQLNET or ObjectStore. The SMP has not be considered; we could have used the proprietary mechanism to send status information to it, or defined it as a CORBA object with an appropriate IDL interface.

However as an example on what is possible, it is easily possible to design and implement a small trace control system; each server has a tracer object, the trace control part of the SMP can call methods to turn traces on particular implementation objects on and off. The SMP also manages the database (using SQLNET).

A script and an SLI are CORBA objects, how they are distributed over servers is a deployment issue. A CORBA server is a process running at a particular node in the system. There is one SLIServer in the system that interfaces with the SSP. It has one CORBA object, the SLIFactory, that is always present when the server is running.

The main purpose of this object is to create new SLI objects when new calls are started (when a TCAP dialogue is opened). The SLIServer is deployed in the node that has the #7 hardware and software installed. The system can have a number of ScriptServers, one per available node.

This server also has a factory object, that exists during the lifetime of the server itself. This factory object is registered in the CORBA Naming service, so that an SLI can find it. In this way service logic distribution is facilitated. Adding more processing power to the system just means installing the new machine, running the ScriptServer on it, and the next time the SLI looks for a ScriptFactory a new possibility is available. The same mechanism also provides some reliability, when a machine goes down for some reason, the SLI will simply not get a reference to that ScriptServer any more. Note that the ScriptFactory is also the best candidate to put a management interface on (e.g. to change the service characteristics), since it is always available as long as the server is running.

The interface between SLI and Script is defined to be asynchronous and in terms of TCAP primitives (BEGIN, INVOKE, RESULT, . . . ). This option is advantageous, since one of the requirements is to reuse existing IN product software. Another option is to define this interface in terms of INAP primitives.

The difference between a CORBA object, a (CORBA) server and a process must be clear. A CORBA object implements an interface and runs within a CORBA server. The CORBA server itself is one process that runs on a host (or node). This definition is important for the relation between a script and a call. In the current IN product implementation, a script is a process that handles different calls, and keeps a different call context for each of those. This is done for performance reasons, starting up a separate process (script) for each call takes some time.

We could adapt a similar approach (one script handles n calls) in these architectures, but the fact that a script has multiple contexts is not that clean and it is possible to deal with the performance issue by having a CORBA server with multiple scripts (each handling one call). So, it is better that in this architecture, a host can run one or more CORBA servers, each running different script objects that each handle a specific call.

The CORBA server is similar to the script in the current IN product, but the problem of handling multiple contexts is shifted from the application programmer to the CORBA platform.

A step further in this sequence of architectures, as second architecture, is to break down the script object into its components. As known, IN services are designed as a number SIBs that are nodes in a service logic graph. The execution of the script means executing SIBs and moving to the next SIB depending on data and responses coming from the SSP. Instead of designing this as a monolithic piece of software (from the SCE), it could be designed in terms cooperating SIBs. As known, the IN capability set is 1. SIBs are not sufficiently defined to used them as they are. This resulted in IN platform providers having their own set of SIBs derived from the standard and software from SIBs is not reusable among platforms.

When SIBs are defined as CORBA objects this situation could be broken and service providers would be able to design there own services, reusing existing SIBs (source code).

Having SIBs as independent CORBA objects offers the possibility to execute the SIBs in different places. Instead of getting the data (using a distributed database, or using CORBA objects) to the place where the script or SIB is executed, we could start the SIB on the machine where the data is located. This brings benefits. We can envisage a scheme where there is a control entity (a script) that executes SIBs remotely or a scheme where control is passed from SIB to SIB.

A third architecture breaks with traditional IN product in the sense that it also makes the SSP a CORBA object. In the previous architectures, for reliability reasons, it is still necessary that CORBA servers are deployed on machines that are interconnected on a reliable LAN. In practice, with the current DPE implementations (TCP/IP) this means putting the machines in the same location. This technology restriction prevents putting the SSP on the DPE, since in practice SCP and SSP sites are located on different places.

However, technology evolves and DPE providers (e.g. IONA) are looking into the possibility of porting their product to other transport protocols, e.g. #7 links for telecommunication purposes. When this happens the step to making the SSP a CORBA object is not that difficult. In this case, the SLI object would not be needed anymore, since the SSP object could take over its role. When a call is started it gets a reference to a ScriptFactory and asks to create the script object itself. It could then communicate with this object directly. Also the language used in this communication (INAP encapsulated in a TCAP based interface) can be simplified. This interface could be defined in terms of INAP primitives (e.g. provide_instruction(args), join(args)). This would improve (simplify) the system design and implementation, since the TCAP layer disappears for the application programmer. One could say that when CORBA is used, the application programmer must only be concerned with the application layer of the communication, not with the session layer (when TCAP is used).

The final step would be to extend so as to integrate a terminal (as proposed by TINA). This would mean a major change in user equipment. However this change is not unfeasible if we consider the fact that more and more users get connected to the internet over their telephone lines. And the technology needed to have the DPE extended to the terminal is similar to this. The benefit of this would be that the terminal to network protocol could become much richer than just passing DTMF tones as numbers.

The above described architectures provides a solution to make especially IN platforms more scalable. Since interworking with and evolution from existing products is important we presented a sequence of architectures that can be seen a possible evolution scenario.

As example a implementation procedure according to the architecture 3 is described in the following:

- A Credit Card Calling service which existed for the UNIX based IN Release existing product is to implement. The Credit Card Call service is a "typical" IN service and allows a call from any terminal to be billed to a particular card number. To set up that call, the user has to enter a card number, a PIN code and the destination number. If the entered data is correct, the call is completed to the destination address and charged to the user's card.
- An SSP simulation stub was used to generate the TCAP dialogue for the Credit Card Call. The SSP stub is a CORBA object that sends and receives the same TCAP messages that an SSP would. The SSP stub is capable of simulating different call scenarios, can generate different call loads and can repeat a scenario an arbitrary number of times.

Another general issue for the use of CORBA in an IN oriented service provisioning architecture is the interworking of CORBA-based IN with legacy IN applications.

This interworking can be achieved with the use of Adaptation. It is related to the way a CORBA based infrastructure can communicate with the legacy of switching systems, namely SSPs.

There are two approaches possible:

1) Definition of an Adaptation Unit which is an application level bridge that provides the mapping of SS.7 and TCAP primitives into IDL invocations.

In order to minimize the impact on existing systems, CORBA should provide framework services and tools in order to achieve this mapping. The availability of such a framework will allow interworking of CORBA-based IN with a variety of existing hardware such as SCPs and HLRs.

Such application level bridge should be characterized by high availability and high performance without being a bottleneck for a distributed system. However for the required real-time performance, this is an intermediate solution towards full IN CORBA-based systems.

This approach would involve building an IDL interface to represent application level protocols such as MAP and INAP and others which are based on the TCAP layer. The TCAP layer provides a 'ROSE-like' asynchronous RPC service over the SCCP layer. And basing the bridge on TCAP will exclude the use of circuit related signaling protocols such as ISUP and TUP from the solution.

Like in the XoJIDM approach, there should be a static translation of the INAP/TCAP specification to IDL interfaces which will be done by a dedicated compiler. Thus, any INAP dialect can be converted to appropriate IDL interfaces. These applications level bridges would implement these IDL generated interfaces and dynamically perform conversion between IDL-derived types and their ASN.1 equivalents.

CORBA nodes using the protocol specific bridges would generally run two servers, one each for processing outgoing and incoming invocations. Since TCAP is a connectionless service, the gateway will have to maintain state in order to match invocations to responses and exceptions.

2) Usage of SS7 as an Environment Specific Inter-ORB protocol (ESIOP):

A possible solution is to map the CORBA GIOP on top of SS7 or to build a new Extended protocol (ESIOP) on top of the SS7 layers.

The ESIOP solution would essentially use an SS7 protocol as a transport for the GIOP protocol. CORBA objects would be visible across the SS7 network in exactly the same manner as they would be across the Internet with the CORBA IIOP. This would allow as ORB to use existing SS7 infrastructure as transport.

It should be noticed that existing signaling networks were never dimensioned to support the sort of traffic which will be exchanged by CORBA nodes. However, there is a potential benefit in this approach by exploiting the fault tolerant nature of the SS7 network.

The first issue here is the choice of SS7 protocol access level for this solution. The two principal choices are TCAP and SCCP:

GIOP at TCAP level:

It should be possible to use TCAP for carrying GIOP messages since IT is essentially a ROSE-like service. Services which make use of TCAP must define their operations using ASN.1 modules. It is envisaged that ASN.1 macros would be used to define the operation set: Request, Reply, CancelRequest, LocateRequest, LocateReply, CloseConnection and MessageError. These operations correspond to the GIOP primitives. The gateway would be responsible for converting CDR format, of the form used by GIOP, into a form transportable using ASN.1 types (possibly as an opaque buffer with BER encoding).

While it should be possible in principle to use TCAP as the basis for the ESIOP, it is not suitable because of:

- the complexity of the implementation.
- the overhead incurred in by the TCAP layer in addition to basic transport
- the asynchronous nature of the protocol.

ESIOP at SCCP level:

The other choice for implementing the SS7 ESIOP is at the SCCP level. The SCCP provides services corresponding to the OSI-RM network layer functionality. It can operate in both connection-oriented and connectionless mode. It should be feasible to use the SCCP to transport GIOP messages although the ESIOP code may be required to perform its own transport layer functions (e.g. end-to-end flow-control and segmentation/re-assembly). It should be possible to address CORBA nodes using the 'Global Title' mode of SCCP addressing It would appear that using SCCP as the basis for an ESIOP for the SS7 network would be the best approach.

The most advantageous approach for an communication between the SSP and the service implementation is the following one:

The TCAP interface is used to establish a dialog between two remote processes. The content of the dialogue consists of INAP invocations.

The approach consists in translation every TCAP primitive into an IDL method. The parameters of the TCAP primitives, that is the INAP methods are converted into IDL types.

An extract of such a TCAP/IDL interface is shown in the Figures.

The TCAP/IDL Interface is used either way from the SSP to the SCP and from the SCP to the SSP as a reply.

The relation between the SSP and the service implementation code is no more restricted to a one to one relationship. There can be only one TCAP/IDL in the SCP or many, for example for each service session.

Following requirements are advantageous for a object oriented environment in an infrastructure in which a service session object interacts (described by hand of the CORBA environment):

In terms of functional requirements, CORBA should provide:

asynchronous Invocation model and support for group communication in the ORB;

proper hooks for extending the ORB with security, transaction and replication mechanisms;

node management and minimal object lifecycle facilities;

a time service and native monitoring facilities for capturing both computational and engineering events;

support for multithreading with flexible event-to-thread mappings.

The non-functional requirements of CORBA are concerned with:

identifying the level of salability and object granularity that the ORB should meet in the IN context;

identifying the performance level that the ORB must achieve in terms of latency, throughput, etc.;

providing a predictable ORB core by instrumenting and documenting the time behavior of the platform;

reliability which denotes requirements that define acceptable behaviors for the distributed applications in the presence of hardware and software failures. In this case two types of reliability can be identified; the integrity state and the availability.

manageability which denotes requirements that enable ease of development, deployment and operation for complex applications. In this case maintainability, (re) configurability and extensibility of CORBA applications.

Asynchronous Invocation model commonly used by IN applications. Thus, asynchronous and optionally isochronous invocation model is required with the ORB. The requirement here is a client side programming model which potentially supports a lightweight asynchronous communication mechanism incorporating a mandatory callback (or ORB "upcall" type mechanism) and optionally a "Futures" type programming model.

For the same object, both asynchronous and synchronous models should co-exist. The maximum concurrency level is defined in the configuration (e.g QoS parameters), and has to be controllable, with the possibility of queuing the request or returning an exception.

A basic fault detection support should be provided by the ORB runtime for any object which needs it. This can be done by a timer which is implicitly set and managed in the client process.

Flexibility and Scalability:

The ORB should be able to support applications handling a large number of objects and should be able to support many simultaneous connections to remote objects.

The memory cost of an unused remote interface reference in a given capsule (i.e. Unix process) should be of the order of a standard language pointer.

A typical telecommunications environment comprises objects of very different granularity's in both space (memory size) and time (object lifetime and duration). A scalable ORB should support objects at different levels of granularity's, and minimize the overhead associated with the handling of small and volatile objects and of connections to remote objects.

To achieve some of the ORB fault-tolerance and reliability, the CORBA object model could be enhanced to support a group of objects or globally known as group communication such as those described.

Reliability and Availability:

To achieve the reliability requirements, the notion of replicated distributed objects can be introduced in CORBA. Thus the critical components of the application are implemented through replicated objects. This replica management can be handled automatically by the ORB such that clients interacting with a given server object are not aware if it is replicated or not. The degree of replication can be determined by the desired level of reliability which can be measured with the number of maximum number of concurrent failures; the nature of the failure which can be typed (malicious or benign); and the type of reliability property being sought such as integrity or availability. High availability or Fault Tolerance capabilities should be provided by CORBA for distributed IN systems in order to ensure the same robustness as current IN systems.

Timeliness requirements can be also achieved by the replica service. For example, applications that need to have bounded and predictable delays will be implemented through replicated objects. Each replica is able to process locally all of the methods defined for the object. In the absence of failure, a client can use any of the responses to a method Invocation as its result, (the invocations in this case are performed synchronously).

To achieve this, the ORB will have a modular structure allowing the implementation of different profiles, depending on application or services requirements. These profiles give an abstraction of the resources provided by the underlying operating system. One of the ORB module will be a failure detector which is at the lower level of the ORB structure. And a response Invocation delay beyond a certain threshold are classified as failure. Thus, the client is able to trade off reliability for timeliness, the shorter the threshold, the tighter the bounds on delays. By replicating an object in a sufficient number of times, the client is able to meet both timeliness and reliability requirements simultaneously.

Here, we have identified a requirement for a replication service with correctness, safety and liveness properties; and a failure detector module which is part of the ORB core.

Performance:

Performance of IN are measured by the number of calls per second for service nodes and intelligent peripherals; and the number of transactions per second for signaling control point. These calls and transactions may involve multiple messages exchanged between an SSP and the Intelligent Layer. To obtain the actual performance of legacy IN systems, real-time performance of the ORB is required for the use of distributed processing in IN systems as well as its distribution on a geographical scale (non centralized IN systems). To achieve better performance for IN distributed systems, the ORB call overhead should be reduced, and the performance level that the ORB must achieve in terms of latency, throughput, etc. should be defined and documented.

Abbreviations:

BCSM Basic Call State Model
 This is a high-level state machine description of CCF activities required to establish and maintain communication paths for users.

CCF Connection Control Function
 Functional entity in the INCM Distributed Functional Plane providing the call processing and control in a bearer (telecommunication) network for basic telephony services and also advanced, switch-based services. The CCF runs the BCSM (on both the originating and terminating ends of a call) in order to allow IN service invocation.

DB Database

DFP Dynamic Feedback Protocol
 This is the mechanism by which servers provide feedback to IP load balancing products.

DPE Distributed Processing Environment
 A computer network environment such that information processing begins in local computers, and the resulting data goes to a central computer for further processing along with data from other local computers.

ESIOP Environment Specific Inter-ORB Protocol
 This implements GIOP for a non-TCP/IP environment.

GIOP General Inter-ORB Protocol
 Makes requests or returns replies between Object Request Brokers.

IDL Interface Definition Language
 An abstract programming language used to specify a client application's interface to objects. The IDL is independent of the actual programming language used to implement either the client or the object.

IIOP Internet Inter-ORB Protocol
 The implementation of GIOP for TCP/IP ps IN Intelligent Network
 Architectural concept for the creation and provisioning of advanced telecommunication services. Its architecture can be applied to various types of telecommunication networks.

INAP Intelligent Network Application Protocol
 Interface protocol for the communication between IN physical network elements (e.g. between SSP and SCP), based on CCS7. INAP is defined in ITU-T. A European version known as "Core INAP" is defined in ETSI.

Core INAP
 Reviewed and refined version of the ITU INAP, defined by ETSI for the European context.

INCM Intelligent Network Conceptual Model
 Modelling tool for the creation of IN architectures and consists of four planes addressing service design aspects, global and distributed provision functionality, and physical aspects of INs.

IN Service
 Telecommunication service offered to end users by a service provider where the service logic is executed to provide the service. A service constitutes a stand-alone commercial offer, characterised by one or more core service features, that can be optionally enhanced by other service features.

IONA IONA Technologies
 A vendor of standards-based platform middleware.

IP Intelligent Peripheral
 Adds additional capabilities to a switch, such as digit recognition and speech synthesis and represents an implementation of a SRF.

ITF Interface

MTP Message Transfer Part
 First three levels of the SS.7 network protocol stack, which collectively provide a highly reliable and resilient connectionless (signalling) message transport mechanism.

ROSE Remote Operations Service Element
 An application layer protocol providing capability for remote operations at a remote process.

SCF Service Control Function
 IN functional entity in the DFP, which is the heart of the IN and controls resources in a switch and/or intelligent peripheral: The SCF contains the service logic programs that are used to provide IN services.

SCP Service Control Point
 Implementation of a SCF in the Physical Plane of the INCM.

SDF Service Data Function
 IN functional entity in the DFP, which contains the service data (customer and network related data) and provides standardised real time access for SCFs to service data. Sometimes this entity is also referred to as "Specialised Data Function".

SDP Service Data Point
 Implementation of an SDF in the Physical Plane of the INCM. Sometimes it is also referred to as "Specialised Data Point".

SIB Service-Independent Building Blocks
 Reusable distributed objects that can be combined and enabled according to a service logic script to provide a service.

SMF Service Management Function
 Provides capabilities for operations which support IN services in the IN functional architecture defined in CS-1.

SMP Service Management Point
 Represents a physical entity that implements the Service Management Function.

SMS Service Management System
 Represents an operations system for IN service management.

SSF Service Switching Function (SSF)
 IN functional entity in the DFP, which represents additional functionality for controlling switch resources and provides a well-defined, service-independent interface between the CCF and the SCF. The SSF contains detection capabilities, e.g. service trigger information, which detect requests for IN services.

SSCP Service Switching and Control Point
 Physical entity in the Physical Plane of the INCM that contains the CCF/SSF, SCF, and SDF. Thus it is a combined SSP and SCP.

SCCP Signalling Connection Control Part
 Provides on top of the MTP within the SS.7 a connectionless (i.e. datagram) as well as a connection-oriented message transport. In addition it enables enhanced addressing capabilities for routing messages within the SS.7 network and further distribution within its network nodes.

SSP Service Switching Point

Physical entity in the Physical Plane of the INCM implementing an SSF.

SS7 Signalling System No. 7

Packet-switched "out-of-band" signalling network for the transport of circuit-related information between exchanges for setup and release of calls.

STP Signalling Transfer Point

A very high-capacity and very reliable packet switch in the SS.7 network that transport signalling messages between the network nodes, e.g. SSPs and SCPs.

SRF Specialised Resource Function

IN functional entity in the DFP, which provides additional functions to a switch for controlling (intelligent) peripheral resources, e.g. for collecting information from call parties or playing announcements to call parties.

TCAP Transaction Capability Application Part

A specific user part in the SS.7 network, which provides remote operation capabilities to higher signalling application protocols, such as INAP. TCAP uses the CCS7 transport services provided by MTP and SCCP.

TMN Telecommunication Management Network

TINA Telecommunication Information Networking Architecture

Definition of the future telecommunications architecture and operations services driven by IN, TMN and ODP. TINA is being developed by an international consortium of network operators and equipment manufactures exploring the future evolution of telecommunication environments.

XoJIDM X/Open's Joint Inter Domain Task Force

X/Open is an international consortium of vendors working to create an internationally supported vendor-independent Common Applications Environment based on industry standards.

What is claimed is:

1. A method for communicating between a service switching exchange of a telecommunication network, to which service calls requesting the execution of a service for a subscriber of the telecommunication network are routed, and a service control facility, which controls the execution of the requested service, comprising the steps of:

providing data from a service switching exchange to at least one object of the service control facility and vice versa, via a transaction capability application part protocol;

providing data from said at least one object to other objects in an object oriented computing environment within the service control facility, and vice versa, via an object infrastructure; and mapping primitives of the transaction capability application part protocol onto an internal interface description of said at least one object, using an interface of said at least one object, said internal interface description using IDL language.

2. A method as claimed in claim 1, characterized in that the TCAP protocol is used as the transaction capability application part protocol which is used in a communication according to the Intelligent Network architecture to establish a dialog between two remote processes.

3. A method as claimed in claim 1, characterized in that said at least one object interacts and communicates as a CORBA object via a CORBA object infrastructure.

4. A method as claimed in claim 1, characterized in that parameters of the primitive of the transaction capability application part protocol are converted into types of the internal interface description.

5. A method as claimed in claim 1, characterized in that INAP methods are converted into IDL types.

6. A method as claimed in claim 1, characterized in that all functions for controlling the execution of the service are implemented by a dedicated CORBA service server.

7. A method as claimed in claim 1, characterized in that the service session object has an interface definition given by TCAP mapped over IDL.

8. A method as claimed in claim 1, wherein TCAP primitives are mapped into IDL invocations invoking an internal IDL interface of said at least one object, in order to map primitives of the transaction capability application part protocol onto an interface description of said at least one object.

9. A method as claimed in claim 1, wherein every TCAP primitive is translated into an IDL method, in order to map primitives of the transaction capability application part protocol onto an interface description of said at least one object.

10. A service control facility for connecting to one or several service switching exchanges of a telecommunication network, where the service control facility comprises:

means for receiving service requests that request the execution of a service for a user of the telecommunication network from at least one of the service switching exchanges of the telecommunication network; and at least one object interacting and communicating via an object infrastructure with other objects in an object oriented computing environment within the service control facility wherein:

said at least one object contains means for interacting with the at least one service switching exchange via a transaction capability application part protocol, said at least one object contains an interface that maps primitives of the transaction capability application part protocol onto an internal interface description of said at least one object, and said internal interface description uses IDL language.

* * * * *